US007110870B2

United States Patent
Tseng et al.

(10) Patent No.: US 7,110,870 B2
(45) Date of Patent: Sep. 19, 2006

(54) SYSTEM AND METHOD FOR DETECTING ROLL RATE SENSOR FAULT

(75) Inventors: Hongtei Eric Tseng, Canton, MI (US); Li Xu, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 10/745,349

(22) Filed: Dec. 22, 2003

(65) Prior Publication Data

US 2004/0181329 A1    Sep. 16, 2004

Related U.S. Application Data

(63) Continuation-in-part of application No. 10/620,881, filed on Jul. 16, 2003, now Pat. No. 6,941,205.

(60) Provisional application No. 60/400,155, filed on Aug. 1, 2002.

(51) Int. Cl.
*B60Q 1/00* (2006.01)

(52) U.S. Cl. .............................. 701/34; 701/38; 701/45; 701/70; 701/72; 701/75; 303/146; 280/755

(58) Field of Classification Search ..................... None
See application file for complete search history.

(56) References Cited

U.S. PATENT DOCUMENTS

| 6,278,930 B1 * | 8/2001 | Yamada et al. ............... 701/82 |
| 6,292,759 B1 * | 9/2001 | Schiffmann ................. 702/151 |
| 6,397,127 B1 * | 5/2002 | Meyers et al. .................. 701/1 |
| 2002/0152012 A1 * | 10/2002 | Watson et al. ................ 701/45 |

* cited by examiner

*Primary Examiner*—Thomas G. Black
*Assistant Examiner*—Eric M. Gibson
(74) *Attorney, Agent, or Firm*—Raymond L. Coppiellie; Artz & Artz, P.C.

(57) ABSTRACT

A control system for an automotive vehicle having a vehicle body includes a sensor cluster having a housing oriented within the vehicle body. A roll rate sensor is positioned within the housing and generates a roll rate sensor signal corresponding to a roll angular motion of the sensor housing. A controller receives the roll rate sensor signal, the controller generates a residue signal in response to a sensor error or a measurement error. The controller sets a fault condition in response to the residue signal larger than a dynamic threshold and a magnitude of the roll rate signal above a fault condition threshold. The controller sets a fault flag in response to the fault condition indicated for a predetermined time during which no double wheel lift occurs.

31 Claims, 4 Drawing Sheets

SYSTEM AND METHOD FOR DETECTING ROLL RATE SENSOR FAULT

RELATED APPLICATION

The present invention is Continuation in Part application of application Ser. No. 10/620,881 filed on Jul. 16, 2003, now U.S. Pat. No. 6,941,205 which claimed priority to provisional application No. 60/400,155 filed on Aug. 1, 2002, the disclosure of which is incorporated by reference herein.

TECHNICAL FIELD

The present invention relates generally to automotive vehicle sensors, and more specifically, to a method and apparatus for detecting a roll rate sensor fault using functional and analytical redundancy.

BACKGROUND

Current rollover stability control (RSC) schemes addressing vehicle roll situations and include a variety of sensors sensing vehicle dynamic conditions. RSC systems further include a controller controlling a distributed brake pressure for reducing a tire moment such that the net moment of the vehicle is counter to the vehicle roll direction.

RSC sensors include a speed sensor, a lateral acceleration sensor, a roll rate sensor, and a yaw rate sensor. The roll rate sensor is typically utilized to estimate the roll angle and to calculate the desired control pressure. Fault modes of the roll rate sensor, therefore, may cause unintended braking, reduced performance or even loss of stability. Such fault modes should be rapidly diagnosed and indicated so that the RSC system is shut down.

U.S. Pat. No. 6,315,373 addresses a similar issue of fault detection for a roll control device. It, however, merely addresses the detection of a lateral accelerometer in a system that uses lateral acceleration signals to detect vehicle roll over stability, which is insufficient for a comprehensive RSC system. Furthermore, this method relies heavily on the vehicle suspension model. Variations of the suspension parameters, such as the spring stiffness and damping ratio, may cause an unnecessary false warning (i.e. false positive) or a missed detection (i.e. false negative).

It is therefore desirable to provide a system that rapidly detects a roll rate sensor fault in a rollover stability control system that can be applied to various vehicle platforms without tuning. This method should also be able to detect a fault independent of the specific fault modes as well as detect a fault that is otherwise not detectable by checking electrical specifications.

SUMMARY OF THE INVENTION

In one aspect of the invention, a control system for an automotive vehicle having a vehicle body includes a sensor cluster having a housing oriented within the vehicle body. A roll rate sensor is positioned within the housing and generates a roll rate sensor signal corresponding to a roll angular motion of the sensor housing. A controller receives the roll rate sensor signal, the controller generates a residue signal in response to a sensor error or a measurement error. The controller sets a fault condition in response to the residue signal larger than a dynamic threshold and a magnitude of the roll rate signal above a fault condition threshold. The controller sets a fault flag in response to the fault condition indicated for a predetermined time during which no double wheel lift occurs.

In a further aspect of the invention, a method for detecting a roll stability control system sensor fault includes generating a compensated roll rate signal having a first threshold; generating a lateral acceleration signal having a second threshold; generating a reference velocity signal having a third threshold; generating a yaw rate signal having a fourth threshold; and generating a small roll rate shift flag in response to the first threshold, the second threshold, the third threshold, and the fourth threshold exceeded for greater than a predetermined time.

One objective of the present invention is to provide a method for fault detection of a roll rate sensor onboard a vehicle. Sensor fault is not always detectable by sensor self test and/or system electronic monitoring, having detection relying on the fault to violate sensor specification. Because an in-range signal fault may occur, a redundancy check is included for a safety critical system. The proposed methodology is to provide such a redundancy check through software and analytical redundancy.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
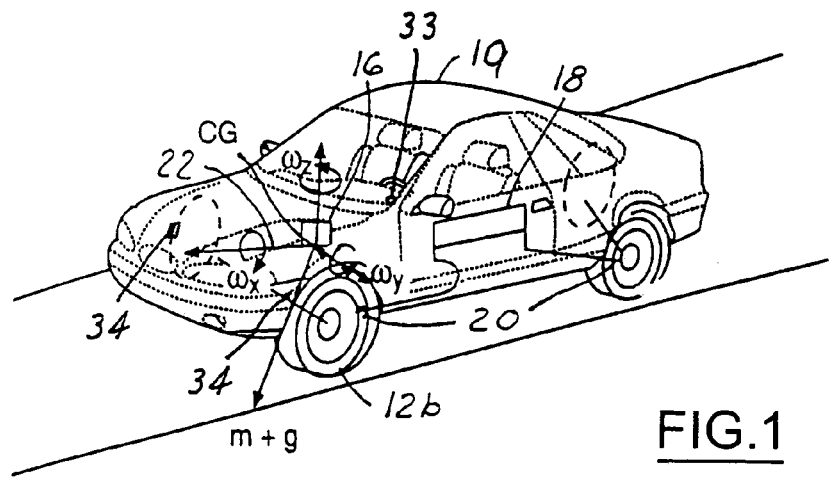
FIG. 1 is a diagrammatic view of a vehicle with variable vectors and coordinator frames in accordance with one embodiment of the present invention.

In the following figures the same reference numerals will be used to identify the same components. The present invention is preferably used to detect roll rate sensor fault in conjunction with a dynamic control system for an automotive vehicle, such as a yaw control system or a rollover control system. However, the present invention may also be used to detect roll rate sensor fault in any vehicle system including a roll rate sensor.

Figure 2:
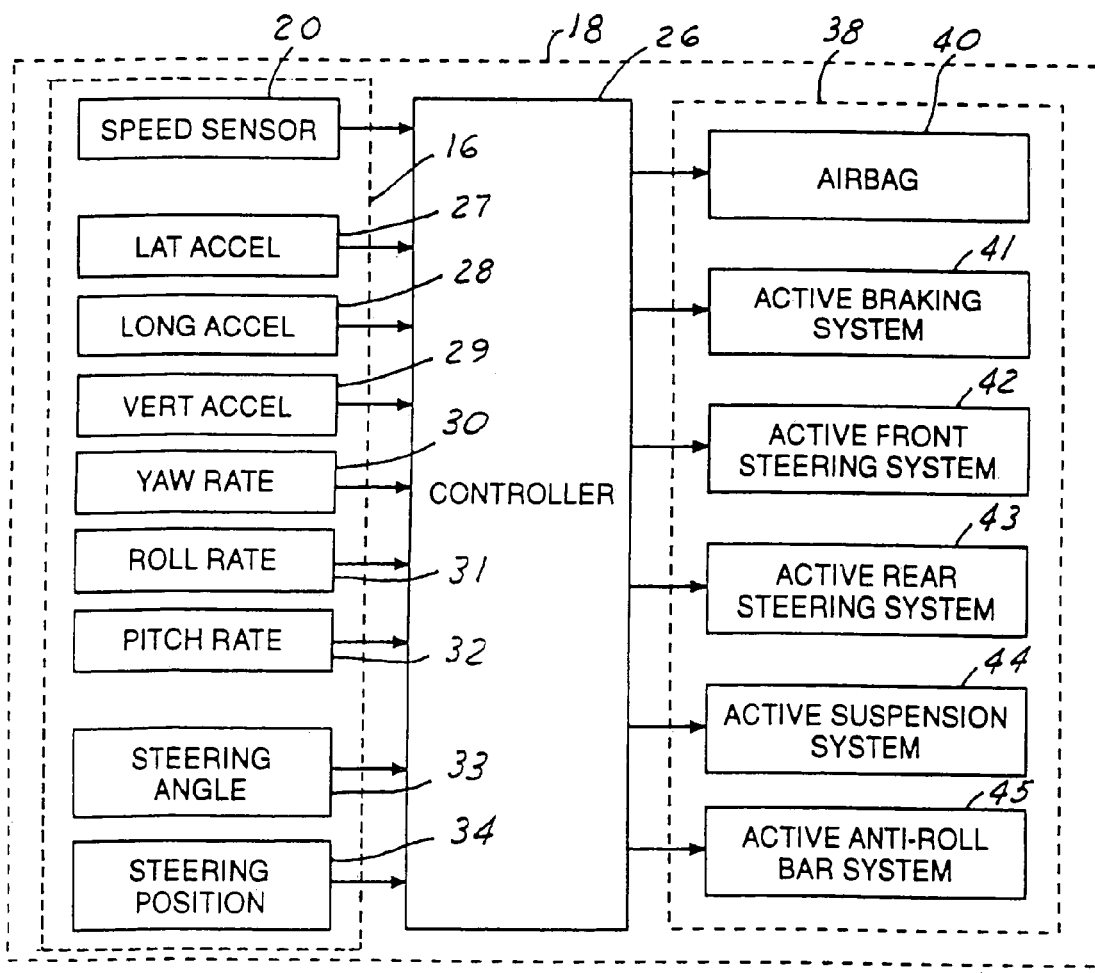
FIG. 2 is a block diagram of the vehicle sensor system in accordance with FIG. 1.

Referring to FIGS. 1 and 2, a safety system 18 for an automotive vehicle 19 having a sensing system 16 (sensing cluster), including a roll rate sensor 31, and a controller 26, is illustrated. Various forces and moments are acting thereon during a rollover condition.

The vehicle safety system 18 includes the sensor system 16. The sensing system 16 may use a six control sensor set including three axial accelerometers including a lateral accelerometer 27, a longitudinal accelerometer 28, and a vertical accelerometer 29 and three axial rotation rate detectors including a yaw rate sensor 30, a roll rate sensor 31, and a pitch rate sensor 32. The sensor system 16 further includes various other sensors, such as wheel speed sensors 20, a steering angle sensor 33 (hand-wheel sensor), and steering angle position sensors 34 (road-wheel sensors). The various sensors will be further described below.

The vehicle safety system 18 includes the roll rate sensor 31 positioned within the housing of the vehicle safety system 18. The roll rate sensor 31 generates, a roll rate sensor signals corresponding to a roll angular motion of the sensor housing.

The vehicle safety system 18 also includes the controller 26. The controller 26 receives the roll rate sensor signals, generates a reference roll angle, and compares the reference roll angle to the roll rate sensor signal. The controller also generates a roll rate sensor fault signal in response to a fault determined in the roll rate sensor.

Based upon inputs from the sensor system 16, the controller 26 may control a safety device 38. Depending on the desired sensitivity of the system and various other factors, not all the sensors is used in a commercial embodiment. The safety device 38 may control an airbag 40 or a steering actuator or braking actuator at one or more of the wheels of the vehicle. Also, other vehicle components such as a suspension control 48 are used to adjust the suspension to prevent rollover. Suspension control 48 may include an anti-roll bar.

Generally, the vehicle 19 has a weight represented as Mg at the center of gravity of the vehicle 19, where g=9.8 m/s$^2$ and M is the total mass of the vehicle 19.

The reference roll angle, a vehicle roll angle in the inertial frame (or the angle between vehicle body lateral axis and the horizon), is obtained with available signals other than roll rate, which is the signal to be verified. This roll angle is an independent reference (from roll rate) of vehicle (global) roll angle, and is therefore termed the "reference roll angle".

In one embodiment of the present invention, the reference roll angle is generated within the controller 26 through the kinematics relationship between lateral acceleration, yaw rate, vehicle longitudinal speed, and vehicle roll angle are utilized. In other words, $$\sin \hat{\phi} = (u \cdot r - a_y)/g$$

where $\phi$ is roll angle, u is vehicle speed, r is yaw rate, g is gravity constant and $a_y$ is lateral acceleration.

The reference roll angle is generated by applying steering wheel angle information to reduce the approximation error due to the negligence of the dynamic lateral velocity derivative in the above equation. Another embodiment of the present invention includes generating a reference roll angle using steering wheel angle from the steering angle sensor 33 or steering position sensor 34, yaw rate from the yaw rate sensor 30, lateral acceleration from the lateral acceleration sensor 27, and vehicle longitudinal speed from the speed sensor 20.

Alternately, the dynamic relation between lateral acceleration experienced by the vehicle body and suspension roll motion is used to generate the reference roll angle. The equation representation thereof is:

$$\frac{d}{dt}\begin{bmatrix} \varphi \\ \dot{\varphi} \end{bmatrix} = \begin{bmatrix} 0 & 1 \\ -K & -C \end{bmatrix}\begin{bmatrix} \varphi \\ \dot{\varphi} \end{bmatrix} + \begin{bmatrix} 0 \\ M/I*H \end{bmatrix} a_y.$$

After obtaining the reference roll angle, the roll rate signal is compensated within the controller 26 for all 'valid' signal biases.

A 'valid' signal bias refers to a bias that may occur due to either an electrical noise within sensor specification and/or due to a mechanical disturbance from maneuvers/road conditions.

For example, a vehicle pitch angle during a turn will induce a measurement bias due to the difference between inertial frame and rotational frame. To illustrate:

$$\dot{\phi} = \omega_x + \sin\phi \cdot \tan\theta \cdot \omega_y + \cos\theta \cdot \tan\theta \cdot \omega_z$$

where $\dot{\phi}$ is Euler roll rate (inertial frame), $\omega_x$, $\omega_y$, and $\omega_z$ are the rotational rate of the body-fixed coordinate. That is, $\omega_x$ is the roll rate sensor measurement, $\omega_z$ is the yaw rate sensor measurement, and $\phi$ is the roll angle of interest. Since vehicle roll angle is generally small, the system 18 is concerned with only the third term (of the right hand side) which is a product of vehicle yaw rate and vehicle pitch angle. That is, $$\dot{\phi} \approx \omega_x + \tan\theta \cdot \omega_z$$

(Important to note is that when a roll rate fault does occur during a turning maneuver, the compensation mechanism may attempt to compensate the biased roll rate signal by adapting the pitch angle in the above equation.)

The vehicle roll rate signal averages to zero over a long period of time, therefore, electrical long term bias is adjusted over time with a minute adjustment at each sampling time.

Similarly, the mechanical, long-term sensor alignment pitch angle is controlled with a minute adjustment at each sampling time during vehicle turning (i.e. $\omega_z \neq 0$) Because chattering is warranted with this approach, the adjustment should be small enough to prevent the chattering magnitude from exceeding the desired accuracy. The small adjustment restricts the adaptation speed. One skilled in the art will realize that the minute adjustment is only one possible embodiment of adjustment, and that numerous other methods are included in the present invention. Other adjustments, such as sliding mode control based on the basic logic/assumption described above, can be applied.

Figure 3:
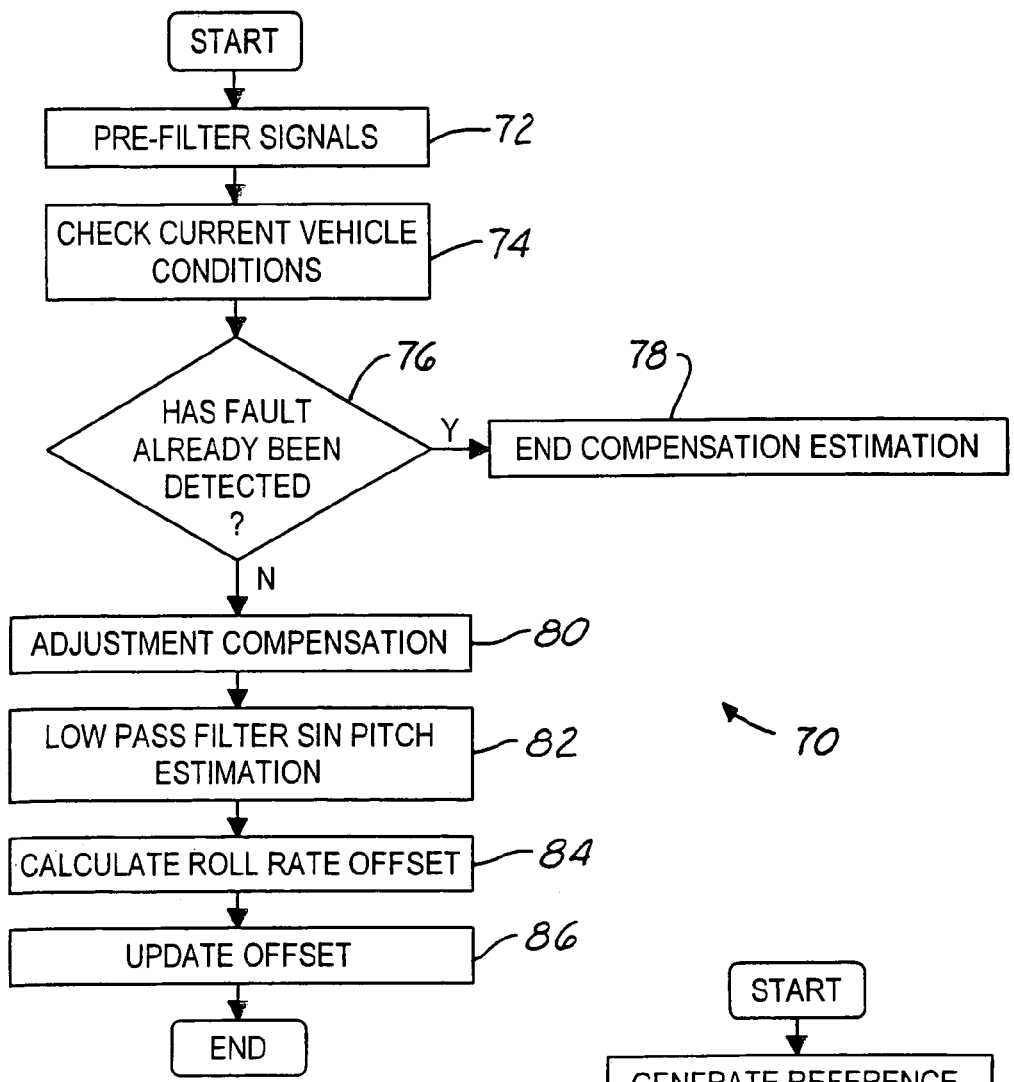
FIG. 3 is a logic flow diagram of a method for signal compensation of the roll rate signal for all 'valid' biases in accordance with another embodiment of the present invention.

Referring to FIG. 3, a logic flow diagram 70 of signal compensation of the roll rate signal for all 'valid' biases is illustrated. Logic starts in operation block 72 where the signals to be processed are pre-filtering (e.g. with a low pass filter).

In operation block 74, current vehicle conditions are checked. In other words, a determination is made whether the yaw rate signal is of significant magnitude such that the signal to noise ratio in the subsequent calculation is meaningful and if current vehicle condition is appropriate to assume zero roll rate.

In inquiry block 76, a check is made whether a fault has already been detected. For a positive response, in operation block 78, roll rate compensation/pitch alignment estimation is stopped if a fault flag is set or is suspected to prevent unneeded and unwanted compensation.

Otherwise, in operation block 80, a compensation for electrical bias occurs with minute adjustments through logic, such as:

```
rollrate_compensated = rawrollrate   –
offset_straight  –  (yawrate*RAD2DEG)*spa_est;
spa_est       –=        p_SPA_DELTA       *
(sign(rollrate_compensated*yawrate)); spa_est   =
min( MAX_SPA, max(MIN_SPA,  spa_est) ),
``` where spa_est is the sine of the pitch angle.

In operation block 82, the sine pitch estimation is low pass filtered to minimize undesirable chattering noises, through logic such as:

lpf_spa=k*lpf_spa+(1–k)*spa_est.

In operation block 84, the total roll rate offset due to both electrical bias (offset_straight) and mechanical bias (lpf_spa and yawrate) is calculated through logic, such as:

offset_dynamic=offset straight+(yawrate*RAD2DEG)
  *(lpf_spa).

In operation block 86, the offset straight is updated during straight line driving (i.e. when the turning condition of operation block 74 is not met) through logic as follows:

```
rollrate_compensated=rawrollrate–
offset_straight;
offset_straight+=p_RR_DELTA*(sign(rollrate_
compensated)).
```

Referring again to FIGS. 1 and 2, the compensated roll rate signal is compared, within the controller 26, with the reference roll angle through kinematics relation and the dynamic interaction related by vehicle suspension. During the comparison, a fault is not declared under a plausible bias due to imperfect compensation (of electrical/mechanical disturbances) nor when the accuracy of reference vehicle roll angle is in question.

In one embodiment of the present invention, the controller 26 compares a high pass filtered reference roll angle to a high pass filtered version of the integration of the compensated roll rate signal. When the two differ and the latter signal is nonzero, a fault is suspected.

In another embodiment of the present invention, the controller 26 compares a low pass filtered version of the derivative of the reference roll angle to the compensated roll rate signal. When the two differ and the roll rate is nonzero, a fault is suspected.

In another embodiment of the present invention, the controller 26 includes a Kalman filter utilizing the suspension dynamic relation between roll angle acceleration, roll angle rate, and roll angle to compare the reference roll angle and the compensated roll rate.

The present invention designs an observer utilizing both the suspension dynamics and kinematics relationship between roll angle and rate. The present invention is robust to suspension parameters variations/uncertainties.

The present invention can be described as a mass-spring system, i.e.:

$$\dot{x} = \begin{bmatrix} 0 & 1 \\ -k & -c \end{bmatrix} x + \begin{bmatrix} 0 \\ 1 \end{bmatrix} d, \quad x = \begin{bmatrix} \phi \\ \dot{\phi} \end{bmatrix}, \text{ and}$$

$$y = \begin{bmatrix} c_{11} & c_{12} \\ c_{21} & c_{22} \end{bmatrix} x + f,$$

where k is the (torsional) spring stiffness, or roll stiffness of the suspension, and c is the (roll) damping coefficient (of the suspension). Because the roll stiffness and damping of a vehicle maybe non-linear and may vary between vehicles and between configurations, these parameter uncertainties are lumped into another term in the aforementioned equation as d and are viewed as disturbances. Because the measurement can be defined as any linear combination of roll angle and roll rate, the C matrix in the equation above is left as design parameters.

$$\hat{y} = \begin{bmatrix} 1 & 1 \\ 0 & 1 \end{bmatrix} \hat{x},$$

Additionally, $$\text{residue} = [\,1 \quad -1\,](y - \hat{y}),$$

$$\dot{\hat{x}} = \begin{bmatrix} 0 & 1 \\ -k & -c \end{bmatrix} \hat{x} + \begin{bmatrix} 1 & 0 \\ 0 & 0 \end{bmatrix} (y - \hat{y}),$$

therefore, it can be shown that $$TF_{d \to residue} = 0$$

$$TF_{\text{roll\_angle\_err} \to residue} = \frac{s}{s+1},$$

and $$TF_{\text{roll\_rate\_err} \to residue} = -\frac{1}{s+1}.$$

Defining the observer output as 'residue' causes a roll rate fault to appear as a residue in the observer output while a roll angle 'measurement' error appears as only a transient noise. Moreover, suspension characteristic changes, modeled as disturbance d, do not affect the observer output. Resultantly the same observer design can be applied to various vehicle platforms without tuning.

If the residue exceeds a pre-calibrated threshold, (which can be a pre-calibrated function of vehicle dynamic status,) a fault is suspected.

If a fault condition is indicated during the aforementioned comparison for a short period of time, having a pre-calibrated length, during which time the system did not detect any fault from the source signal that generated reference roll angle, then a roll rate sensor fault is concluded. Alternately, to facilitate a faster detection, a condition is added to check if roll rate signal is away from zero (which is the normal value) during this period.

Following detection of a roll rate sensor fault, the controller 26 responds by either shutting down the safety system 18 or any of the sub-systems of the safety system 18, such as roll-over control and compensation. Alternately, the controller 26 responds to roll rate sensor error by compensating for information that would normally be obtained from the roll rate sensor 31. In one embodiment, the controller 26 compensates for the roll rate sensor using signals from a combination sensors including, but not limited to: the lateral accelerometer 27, the longitudinal accelerometer 28, the vertical accelerometer 29, the yaw rate sensor 30, the pitch rate sensor 32, the wheel speed sensors 20, the steering angle sensor 33 (hand-wheel sensor), and steering angle position sensors 34 (road-wheel sensors). Regardless of the controller response to roll rate fault, a further embodiment of the present invention includes a driver notification of roll rate sensor problems.

Figure 4:
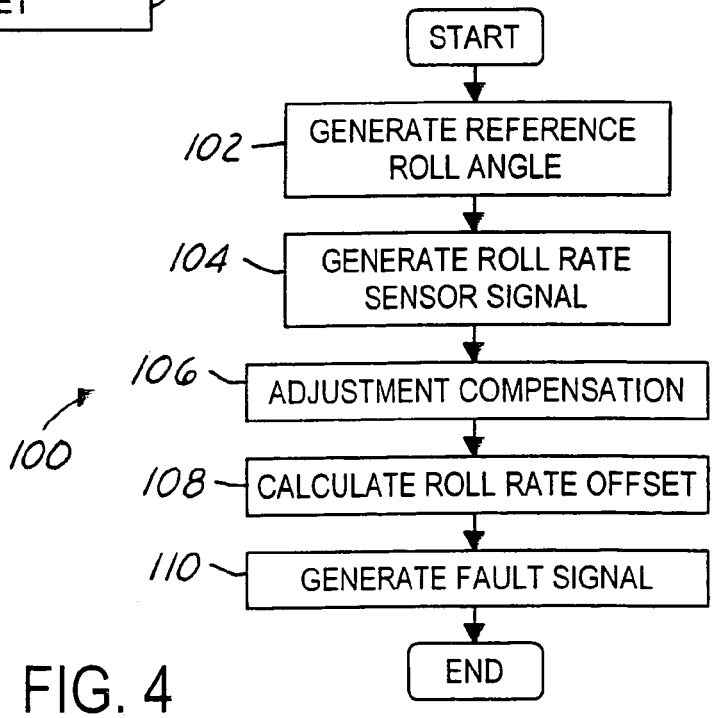
FIG. 4 is, a logic flow diagram of a method for detecting a roll rate sensor fault in accordance with another embodiment of the present invention.

Referring now to FIG. 4, a logic flow diagram 100 of a method for detecting a roll rate sensor fault is illustrated. Logic starts in operation block 102, where a reference roll angle is generated from available signals other than the roll rate signal, as was discussed previously.

In operation block 104, a roll rate sensor signal is generated from the roll rate sensor.

In operation block 106, the reference roll angle is compared to the roll rate sensor signal. In operation block 108, a roll rate sensor fault signal is generated.

If a fault condition is indicated in FIG. 4 and the roll rate magnitude is above a threshold for a continuous time, the roll rate plausibility 'Fault Flag' is set by the controller 26 (in operation block 110) important to note is that the nonzero rollrate (for a continuous time) is another way to prevent a false roll rate fault detection resulting from an Enhanced Stability Program (ESP) sensor fault other than from the roll rate sensor 31.

One special fault that is generally not detected by the above general plausibility logic is the "sticking roll rate signal," i.e. the roll rate signal occasionally sticks to a constant value. To detect this fault, the 'suspension roll rate from Ay' is used to cross check the roll rate sensor signal. If 'suspension roll rate from Ay' is changing (e.g., due to turning), while the roll rate signal does not change at all, a 'Sticking Signal Fault Flag' is set. This function may be disabled to reduce runtime whenever RSC (roll stability control), AYC (yaw control) or TCS (traction control system) are in cycle.

Small roll rate shift (e.g., 3–7 deg/s roll rate fault) is also very difficult for detection by the above general plausibility logic. Thus a special function is added to assist the detection of this kind of fault. Regarding three simple cases: straight driving, e.g., 0.1 g steady state turns, and 0.2 g steady state turns in which the roll rate $\omega_x$ term should be zero. Thus $\dot{\phi}$ is equal to $\tan\theta \cdot \omega_z$, which should be less than, for example, 3 deg/s. If roll rate sensor generates an alternate reading (larger than 3 deg/s), there may be a sensor fault, and a 'Small Shift Fault Flag' is set. This function is also disabled whenever RSC, AYC or TCS is in cycle for runtime reduction purpose.

If either 'Fault Flag', 'Sticking Signal Fault Flag', 'Small Shift Fault Flag' is set and no double wheel lift is detected, the warning lamp is lit and RSC is shut down. At the same time, a counter, e.g. a 5-second counter, is triggered. If there is no Enhanced Stability Program (the underlying system) sensor failure code logged within a few seconds, a roll rate sensor fault code is logged.

Figure 5:
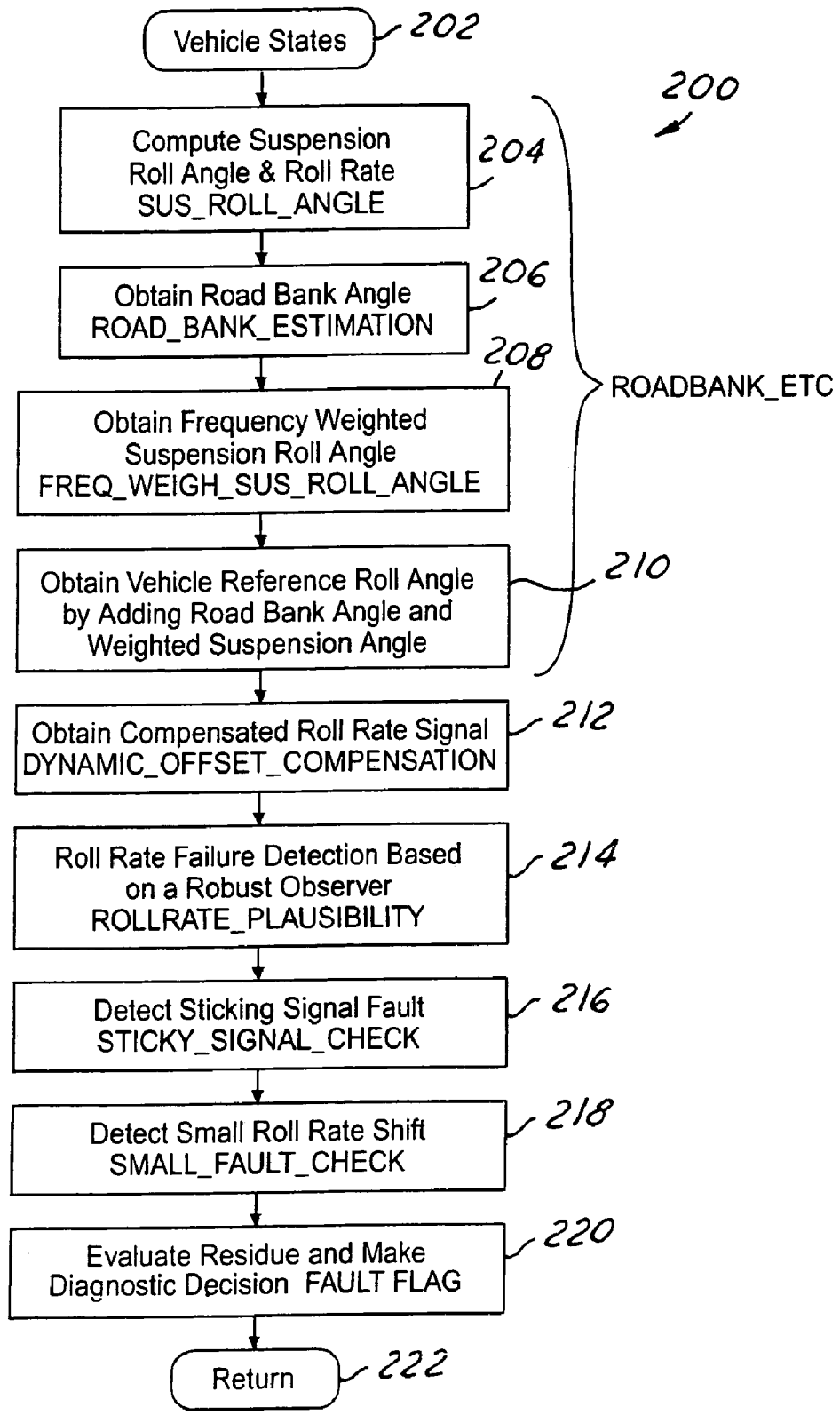
FIG. 5 is a logic flow diagram of a method for roll stability control in accordance with another embodiment of the present invention

Referring to FIG. 5, a logic flow diagram 200 of a method for operating an RSC plausibility module within the controller 26 is illustrated. The RSC plausibility module includes, for example: a road bank module, road bank estimation module, a frequency weighted module, a compensation module, a roll rate plausibility module, sticky signal check module, a small fault check module, fault flag module, and a dynamic offset compensation module. These are just some examples of possible logic modules within the controller 26 and are not meant to be limiting but are included to group sections of controller code together.

Logic starts in operation block 202 where the controller 26 receives vehicle state signals from the vehicle sensors.

In operation block 204, a suspension roll angle and roll rate are computed in the controller 26 road bank module (ROAD BANK_ETC module), for example. Inputs to the road bank module include the steering wheel angle, a reference velocity (longitudinal speed), a yaw rate, and a lateral acceleration, i.e.:

ss_PlsSteeringwheelAngle (deg): CW_SteeringWheelAngle, $\delta_{hand}$
ss_mps_REF_VELOCITY_YC (m/s) Longitudinal-Speed, u
ss_PlsFltYawRate (deg/s): CW_YawRate, r
ss_PlsFltLatAcc (m/s/s): TR_LateralAcceleration, $a_y$.

Outputs to the road bank module include a reference roll angle, a suspension roll angle, a frequency rated suspension roll angle, a dynamic factor, a roll rate offset, a pitch angle, and a fault sine pitch angle, i.e.:

ss_GLBL_ROLL_PLAUS (deg)
ss_SUSPENSION_ROLL_ANGLE (deg)
ss_FREQUENCY WEIGHTED_SRA (deg)
ss_DNCF
ss_RR_OFFSET_STRAIGHT (deg/s)
ss_SINE_PITCH_ANGLE (rad)
ss_FLT_SINE PITCH_ANGLE (rad).

In operation block 206, the road bank estimation module obtains the road bank angle (lower frequency component) and suspension roll angle (higher frequency component) and adds them together.

The road bank estimation module obtains a vehicle/road bank angle based on steering wheel angle, yaw rate, lateral acceleration and vehicle speed. Vehicle banking angle and road banking angle are used interchangeably in this paragraph (and this paragraph only). This is because, with the logic in this paragraph, interest is obtaining the lower frequency component of the vehicle/road banking angle when vehicle suspension roll motion can be neglected. The fidelity of the obtained vehicle/road bank angle is expected to be within, for example, 5 deg for low frequency maneuvers.

Inputs to the road bank estimation module include steering wheel angle ($\delta_{hand}$) vehicle longitudinal velocity (u), yaw rate (r), and lateral acceleration ($a_y$), i.e.:

$\delta_{hand}$ (steering wheel angle), u, r, $a_y$.

Outputs to the road bank estimation module include a frequency weighted sine bank angle, a frequency component gain for sine bank angle, a frequency component gain for sine bank angle, and a Dynamic factor reflecting vehicle dynamic status, i.e.:

ss_ReSineBankAngle (rad): Frequency weighted sine bank angle (Local)
ss_ReGain0_07: Frequency component gain for sine bank angle (Local)
ss_ReGain0_43: Frequency component gain for sine bank angle (Local)
ss_ReGain4_3: Frequency component gain for sine bank angle (Local)
ss_DNCF: Dynamic factor reflecting vehicle dynamic status.

Stored variables in a controller random access memory (RAM) include:

ss_FLT_0_07_SBA_RMDR
ss_Z1_FLT_0_07_SBA
ss_FLT_0_43_SBA_RMDR ss_Z1_FLT_0_43_SBA
ss_Z1_FLT_4_3_SBA
ss_DIFF_FLT_SBA_RMNDR
ss_Z1_DIFF_FLT_SBA
ss_FLT_DIFF_FLT_SBA_RMDR
ss_FLT_10_04_DNCF
ss_FLT_10_04_DNCF_RMNDR
ss_FLT_10_09_DNCF
ss_FLT_10_09_DNCF_RMNDR.

The road bank estimation module generates $\sin \hat{\phi}_v$ and DNCF, a raw vehicle/road banking angle estimate and a dynamic factor reflecting vehicle dynamic status (as opposed to steady state status) through the following wherein outputs include:

ss_SINE_BANK_ANGLE (rad), raw sine bank angle $\sin \hat{\phi}_v$;

ss_DNCF, dynamic factor (DNCF);

$\sin \hat{1\phi}_v$ is generated through:

$$\sin \hat{\phi}_v = (u \cdot r - a_y)/g$$

$\sin \hat{\phi}_v$ is further passed through a low-pass filter to reduce high frequency noise.

DNCF is generated through:

$$DNFC = \frac{2 \cdot u}{(L + k \cdot u^2)g}[k \cdot a_y + L \cdot r - \delta].$$

DNCF is further passed through a low-pass filter to reduce high frequency noise.

Figure 6:
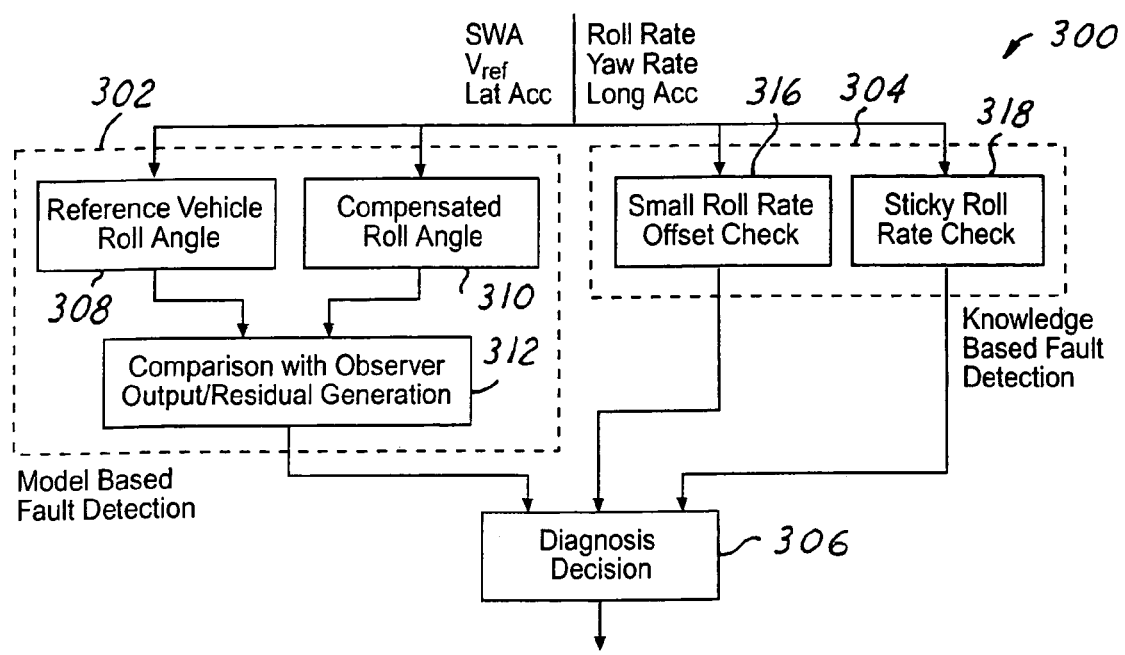
FIG. 6 is a logic flow diagram of roll stability control logic in accordance with another embodiment of the present invention.

The road bank estimation module further generates a refined vehicle/road banking angle estimate by modulating the raw estimate ($\sin \hat{\phi}_v$ or SBA) with DNCF (and derivative of raw estimate). A frequency-weighted modulation may be performed. A factor between, for example, 0 and 1 is multiplied to the raw estimate where the multiplicative factor is frequency dependent. As shown in FIG. 6, the raw estimate is broken down to three frequency ranges and the modulations for each frequency range are different.

The refined estimate obtained above will be referred to as 'Frequency Weighted (Sine of) Road bank Angle', ss_ReSineBankAngle, having units in radians.

Directional dependent low pass filters, 'nl_lpf_10_04', 'nl_lpf_10_05', and 'nl_lpf_10_09' are used in the above signal flow/calculations. These include simple first order low pass filters having cutoff frequencies (and corresponding filter coefficients) switched according to the source signal. Functionally, they adjust the memory length of the signal's past history based on the trend/direction of the signal itself.

In operation block 204, suspension roll angle is generated. To start with, a vehicle suspension angle based on lateral acceleration information is obtained.

Using a single mass-spring suspension roll model, a dynamic relation between suspension roll rate/angle and lateral acceleration can be established. Because the controller 26 requires the vehicle roll angle generated from lateral tire force for RSC, lateral acceleration is primarily considered as the (roll moment) input to this suspension model.

In other words, the input is: ss_PlsFltLatAcc (m/s/s): $a_y$, and the outputs are: ss_SUSPENSION_ROLL_ANGLE (deg), the SuspensionRollAnglefromAy, $\phi$, and ss_Z_SUS_ROLL_RATE (deg/s), the suspension roll rate from Ay, $\dot{\phi}$.

A vehicle suspension angle and rate are generated based on lateral acceleration information. Using a single mass-spring suspension roll model, a dynamic relation between suspension roll rate/angle and lateral acceleration can be established. The controller 26 uses lateral acceleration as the (roll moment) input to the following suspension model:

$$\frac{d}{dt}\begin{bmatrix}\varphi\\\dot{\varphi}\end{bmatrix} = \begin{bmatrix}0 & 1\\-K & -C\end{bmatrix}\begin{bmatrix}\varphi\\\dot{\varphi}\end{bmatrix} + \begin{bmatrix}0\\M/I*H\end{bmatrix}a_y.$$

Code for this model includes:

```
ss_SUSPENSION_ROLL_ANGLE +=
ss_SUSPENSION_ROLL_ANGLE * p_LOOP_TIME_SEC;
ss_
SuspensionRollRate += ( - ( K_MDL *
ss_SUSPENSION_ROLL_ANGLE)
- ( C_MDL * ss_SuspensionRollRate )
+ ( M_MDL / I_MDL * H_MDL * ss_PlsFltLatAcc).
```

In operation block 208, a frequency weighted suspension roll angle is generated. To start with, a frequency weighted suspension roll angle that generally does not contain any suspension roll angle that may have been included in said 'Frequency Weighted (Sine of) Road bank Angle' is generated through the controller frequency weighted module.

Inputs to the frequency weighted module include a suspension roll angle:

ss_SUSPENSION_ROLL_ANGLE (deg), Suspension-RollAnglefromAy.

Outputs include a frequency weighted suspension roll angle:

ss_FREQUENCY_WEIGHTED_SRA (deg), Frequency-WeightedSuspensionRollAngle.

Stored information in the module includes suspension roll angle information, e.g.:

ss_FLT_0_07_SRA_RMNDR
ss_FLT_0_43_SRA_RMNDR
ss_Z1_FLT_0_43_SRA
ss_Z1_FLT_4_3_SRA.

An actual vehicle bank angle includes the suspension angle. Because the generated 'frequency weighted vehicle/road bank angle' may contain the suspension angle, a determination of mutual exclusivity is made so that both may be combined (to obtain a Reference Vehicle Roll Angle in operation block 210). Therefore, the frequency-weighted scheme is used again to generate a 'frequency weighted suspension angle'.

A frequency-weighted modulation is performed as follows: multiplicative factors (three are used for this example) that are complement of the ones used in 'frequency weighted vehicle/road bank angle' are multiplied to the suspension roll angle. The suspension roll angle is broken down to three frequency ranges and the modulations for each frequency range are different. The resulting frequency weighted suspension roll angle may be denoted as ss_FREQUENCY_WEIGHTED_SRA in the code.

Once the controller 26 has both. 'frequency weighted vehicle/road bank angle' and 'frequency weighted suspension roll angle' which are mutually exclusive, the two are added in operation block 210 to obtain Reference Vehicle Roll Angle. The logic therefore may be written as:

*ss_GLBL_ROLL_PLAUS=a* sin(*ss_ReSineBankAngle*)+*ss_*FREQUENCY_WEIGHTED_*SRA.*

In operation block 212 a compensated roll rate signal is generated in the controller 26. A compensation module, e.g. DYNAMIC_OFFSET_COMPENSATION generates the compensation.

Inputs for the compensation module include longitudinal speed, yaw rate, lateral acceleration, roll rate, an offset while the vehicle is standing still, a suspension roll rate from lateral acceleration, a straight roll rate offset, a sine of pitch angle, and a residue, i.e.:

ss_mps_REF_VELOCITY_YC (m/s): Longitudinal-Speed, u
ss_PlsFltYawRate (deg/s): CW_YawRate, r
ss_PlsFltLatAcc (m/s/s): TR_LateralAcceleration, $a_y$
ss_dps_ROLL_RATE (deg/s): RawRollRate
ss_dps_ROLL_RATE_OFFSET_INIT (deg/s): Offset at Standing Still (for Initial Keyon & Temperature Computation)
ss_Z1_SUS_ROLL_RATE (deg/s): SuspensionRollRatefromAy
NVRAM value of ss_RR_OFFSET_STRAIGHT
NVRAM value of ss_SINE_PITCH_ANGLE
ss_FLT_RESIDUE.

Outputs for the compensation module include a roll rate offset, a sine of pitch angle, a filtered sine of pitch angle, and a dynamic offset, i.e.:

ss_RR_OFFSET_STRAIGHT (deg/s)
ss_SINE_PITCH_ANGLE (rad)
ss_FLT_SINE_PITCH_ANGLE (rad)
ss_OffsetDynamic (Local).

Stored elements include:
ss_Z1_FLT_PLAUS_DOC_COMP_ROLL_RATE
ss_Z1_FLT_PLAUS_DOC_YAW_RATE
ss_FLT_SINE_PITCH_ANGLE_RMNDR.

With the virtue of vehicle roll rate signal averages to zero over a long period of time, the electrical long term bias over time is adjusted with a minute adjustment at each sampling time. Similarly, the mechanical long term sensor alignment pitch angle is adjusted with a minute adjustment at each sampling time. Since chattering is warranted with this approach, the adjustment is small enough to prevent the chattering magnitude from exceeding the desired accuracy. The small adjustment constrains the adaptation speed. Since the goal of this compensation is for long term pitch angle offset, this should not be an issue and a small pitch adaptation speed should be sufficient.

In the following description, raw roll rate (rawrollrate) is actually the roll rate having rough electrical bias (determined during vehicle standing still) deducted. That is:

$$RawRollRate = RawRollRate - \text{Roll Rate Offset at Standing Still}$$

Roll Rate Offset at Standing Still is quickly determined at key on when vehicle is standing still. Subsequently, it is adjusted very slowly (other than for when the vehicle is turning) for temperature compensation.

Pre-filtering the signals to be processed in order to ensure proper action includes:

$$lpf\_yawrate = 0.011 * CW\_YawRate + 0.989 * lpf\_yawrate$$

$$lpf\_rollrate = 0.011 * RawRollRate + 0.989 * lpf\_rollrate$$

$$lpf\_rollratefromay = 0.011 * SuspensionRollRatefromAy + 0.989 * lpf\_rollratefromay.$$

A determination is made whether there is significant magnitude such that the signal to noise ratio in the subsequent calculation is relevant. Roll rate compensation/pitch alignment estimation are halted if a fault_flag is set or if the residue is abnormally large to prevent on going compensation if a fault does occur. If so, then a check is made (with a small rollrate_from Ay condition) whether current vehicle is in steady state so that the zero roll rate assumption is valid. Logic for this check includes:

```
if (!fault_flag) {
  if ( (fabs(TR_LateralAcceleration) >
      max(0.25, 3/RAD2DEG* LongitudinalSpeed) ) &&
      (fabs(lpf_yawrate)> 3) && // 3 deg/sec
      (fabs(ss_FLT_RESIDUE) <= 5) ) {
    if (fabs(lpf_rollratefromay) < 0.5) { ...
```

Both lateral acceleration (latacc) and yaw rate (yawrate) are used in determining if the vehicle is turning to minimize possible coupling effect of yaw rate fault. In the case of yaw rate fault, this compensation will generally not be triggered during straight driving situations.

The sine pitch estimation is compensation for electrical bias and low pass filtered to minimize chattering noises, the cut off frequency is here included as allow frequency, e.g.

$$lpf\_spa = 255.0/256.0 * lpf\_spa + 1.0/256.0 * spa\_est.$$

The total roll rate offset due to both electrical bias (offset_straight) and mechanical bias (lpf_spa and yawrate) is calculated through:

```
offset_dynamic =  offset_straight
              +       lpf_yawrate*(lpf_spa
         p_FUDGE_FACTOR*sign(lpf_yawrate));
``` where offset_dynamic is a dynamic offset, offset straight is a straight offset, lpf_yawrate is a yawrate pass filter, _FUDGE_FACTOR is a constant determined during manufacture.

Offset straight is updated during straight line driving (i.e. when the above turning condition is not met) as follows:

$$rollrate\_compensated = lpf\_rollrate - offset\_straight;$$

```
offset_straight  +=  p_RR_DELTA  *
          (sign(rollrate_compensated)).
```

In operation block 214, roll rate failure detection is conducted based on a robust observer in a roll rate plausibility module using residue inputs, global roll plausibility (ss_GLBL_ROLL_PLAUS) and compensated rollrate (ss_COMPENSATED_ROLLRATE):

ss_GLBL_ROLL_PLAUS (deg)
ss_COMPENSATED_ROLLRATE (deg/s).

Outputs include residue and filtered (FLT) residue:
ss_RESIDUE
ss_FLT_RESIDUE,
and observer inputs include:
ss_OBSERVER_INP1
ss_OBSERVER_INP2.

The controller 26 stores:
ss_OBSERVER_OUT1
ss_OBSERVER_OUT2
ss_OBSERVER_N1
ss_OBSERVER_N2.

Using these inputs and outputs, the $$\begin{bmatrix} ss\_OBSERVER\_OUT1 \\ ss\_OBSERVER\_OUT2 \end{bmatrix} = \begin{bmatrix} 1 & 1 \\ 0 & 1 \end{bmatrix} \cdot \begin{bmatrix} ss\_OBSERVER\_N1 \\ ss\_OBSERVER\_N2 \end{bmatrix}$$

plausibility module calculates: using:

$$\begin{bmatrix} ss\_OBSERVER\_N1 \\ ss\_OBSERVER\_N2 \end{bmatrix} = \begin{bmatrix} 1 & dT \\ -k \cdot dT & 1 - c \cdot dT \end{bmatrix} \cdot$$

$$\begin{bmatrix} ss\_OBSERVER\_N1 \\ ss\_OBSERVER\_N2 \end{bmatrix} +$$

$$\begin{bmatrix} 1 & 0 \\ 0 & 0 \end{bmatrix} \cdot \begin{bmatrix} ss\_OBSERVER\_INP1 \\ ss\_OBSERVER\_INP2 \end{bmatrix} dT$$

where is the sampling period, and n is the sampling instance. Also:
The plausibility module then calculates the $$\begin{bmatrix} ss\_OBSERVER\_INP1 \\ ss\_OBSERVER\_INP2 \end{bmatrix} = \begin{bmatrix} 1 & 1 \\ 0 & 1 \end{bmatrix} \cdot$$

$$\begin{bmatrix} ss\_GLBL\_ROLL\_PLAUS - ss\_OBSERVEROUT1 \\ ss\_COMPENSATED\_ROLLRATE - ss\_OBSERVEROUT2 \end{bmatrix}$$

observer output through:
The plausibility module then calculates residue through:

$$ss\_RESIDUE = \begin{bmatrix} 1 & -1 \end{bmatrix} \cdot \begin{bmatrix} ss\_OBSERVER\_INP1 \\ ss\_OBSERVER\_INP2 \end{bmatrix}.$$

The residue is then filtered to generate ss_FLT_RESIDUE, the filtered residue.

In operation block 216, a sticking signal fault is detected in a sticking signal module. For sticking signal fault such that the roll rate signal sticks to certain constant value, the following logic is developed wherein sticking signal module inputs include:
ss_mps_REF_VELOCITY_YC
ss_COMPENSATED_ROLLRATE
ss_SUSPENSION_ROLL_ANGLE
ss_DNCF.
and outputs include a fault flag:
uc_SSC_FAULT_FLAG.
Parameters may be defaulted as:
SSC_MAX_DNCF, (maximum dynamic factor default 0.5)
SSC_STICKY_SIGNAL_TIME, (length for sticking signal activation default 12 seconds)
SSC_HIGH_SUS_ROLL_ANGLE_TIME, (maximum suspension roll angle time default 6 seconds)
SSC_FAULT_EVENT, (fault event default 1)
SSC_FLT_ROLL_RATE_LIMIT, (filtered roll rate limit default 0.5 deg/s)
SSC_FLT_SUS_ROLL_ANGLE_LIMIT, (filtered suspension roll angle limit default 1 deg)
SSC_MIN_SPEED, (minimum speed for activation default 5 m/s).

Logic for the sticky signal check module includes: using a high pass filter to take out the low frequency component in ss_COMPENSATED_ROLLRATE, and using a high pass filter to take out the low frequency component in ss_SUSPENSION_ROLL_ANGLE.

Logic for the sticky signal check module further includes checking whether the roll rate is changing or the suspension roll angle is changing and determining a fault of they are changing for longer than predetermined thresholds, as follows:

---

If (ss_DNCF < 0.5) /* if vehicle is stable */
{If ( abs(filtered ss_COMPENSATED_ROLLRATE) < 0.5deg/s && ss_mps_REF_VELOCITY_YC >5m/s ) holds true for more than 12 seconds /*roll rate not changing for a period of time*/
&&(min[abs(ss_SUSPENSION_ROLL_ANGLE), abs(filtered SS_SUSPENSION_ROLL_ANGLE)] > 1deg) holds true for more than 6 seconds (not -continued necessarily continuously), /*suspension roll angle changing*/then a fault is suspected.

---

If these suspected situations have occurred more than one time, the controller 26 sets the sticking signal fault flag (uc_SSCFAULTFLAG).

The dynamic factor (ss_DNCF) is used in determining if the vehicle is stable to minimize possible false detection. In the case of unstable vehicle (large ss_DNCF), this detection will not be triggered. All the parameters can be tuned to achieve a faster detection or to avoid false detection.

In operation block 218, small roll rate shift is detected. For small roll rate shift (e.g. 3–7 deg/s), the following logic is developed for the small fault check module (SMALL_FAULT_CHECK), wherein inputs include:
ss_mps_REF_VELOCITY_YC
ss_mpss_LAT_ACC
ss_COMPENSATED_ROLLRATE
ss_dps_YAW_RATE
ss_DNCF
ss_THRESHOLD.
Outputs include:
uc_SFC_FAULT_FLAG.
Parameters are set as:
SFC_MAX_DNCF, (maximum dynamic factor default 0.5)
SFC_MAX_THRESHOLD, (maximum threshold default 6.0)
SFC_MAX_TURN_LAT_ACC, (maximum lateral acceleration during a turn default 0.98 m/s/s)
SFC_MIN_TURN_SPEED, (minimum turning speed default 10 m/s)

SFC_MAX_STRAIGHT_LAT_ACC, (maximum straight lateral acceleration default 0.5 m/s/s)
SFC_MIN_TURN_ROLL_RATE, (minimum turn roll rate default 4 deg/s)
SFC_MIN_STRAIGHT ROLL_RATE, (minimum straight roll rate default 3 deg/s)
SFC_MIN_YAW_RATE, (minimum yaw rate default 3.0 deg/s)
SFC_SMALL_FAULT_TIME, (fault time threshold default 5 seconds),
and logic includes:
If (ss_DNCF<0.5 && ss_THRESHOLD<6.0)/*if vehicle stable/on banked surface,*/
then {If (abs(filtered ss_COMPENSATED_ROLLRATE) >4 deg/s && abs(ss_mpss_LAT_ACC) 0.98 m/s/s && abs(ss_mps_REF_VELOCITY_YC)>10 m/s)/*0.1 g turn case*/(abs(filtered ss_COMPENSATED_ROLLRATE)>4 deg/s && abs(ss_mpss_LAT_ACC)<2*0.98 m/s/s
&& abs(ss_mps_REF_VELOCITY_YC)>2*10 m/s)/*0.2 g turn case*/
abs(filtered s_COMPENSATED_ROLLRATE)>4 deg/s/ *straight driving case*/
& abs(ss_mpss_LAT_ACC)<0.5 m/s/s
& abs(ss_dps_YAW_RATE)<3 deg/s
& abs(ss_mps_REF_VELOCITY_YC)>10/2 m/s)
holds true for more than 5 seconds then the small roll rate shift fault flag—uc_SFC_FAULT_FLAG is set.}.

The aforementioned logic sets a plurality of parameter states above which a fault may be occurring and a fault signal is generated. Both ss_DNCF and ss_THRESHOLD are used in determining if the vehicle is stable or on a banked surface to minimize possible false detection (The dynamic threshold ss_THRESHOLD will be discussed in the next operation block). In the case of unstable vehicle (large ss_DNCF) or on banked surface (large ss_THRESHOLD), this detection will not be triggered. All the parameters can be tuned to achieve a faster detection or to avoid false detection.

In operation block 220, a fault flag is generated in a fault flag module (FAULT_FLAG) in response to residue evaluations and diagnostic decisions. Inputs include:
s_FLT_RESIDUE
s_GLBL_ROLL_PLAUS
s_DNCF
s_COMPENSATED_ROLLRATE
s_ROUGH_PITCH
s_FLT ROUGH_PITCH
c_SSC_FAULT_FLAG
c_SFC_FAULT_FLAG.
Outputs include:
THRESHOLD (the threshold exceeded)
C_PLAUSIBILITY_FAULT_PRESENT (which plausibility fault is present)
uc_PLAUSIBILITY_FAULT_FLAG (the plausibility fault signal).
Parameters include:
FF_PLAUS_ROLL_ERR_BUDGET, (plausibility roll error budget default 3 deg/s)
FF_MIN_COMP_RR_4_FAULT, (minimum computed roll rate for fault detection default 3.0 deg/s)
FF_FAULT_COUNTER, (fault counter default 400 ms)
FF_AYC_SYNC_DELAY, (synchronous delay default 5 seconds)
FF_PITCH4THRESHOLD ERR_BUDGET, (pitch for threshold error budget default 3 deg)
FF_FLTYAWRATE_ERR_BUDGET, (flat yaw rate error budget default 5 deg/s)
FF_OVER_FLOW_RRFROMPITCH, (over flow roll rate due to pitching of vehicle, default 10 deg/s)
FF_MIN_COMP_RR_4_FAULT, (minimum computed roll rate for fault default 3 deg/s)
FF_FAULT_COUNTER, (fault counter default 400 ms).

Roll rate bias (coupled from yaw rate) is computed for threshold calculation. As pointed out before, a vehicle pitch angle during a turn will induce a measurement bias due to the difference between inertial frame and rotational frame. This roll rate bias due to pitch misalignment has been compensated in the dynamic offset compensation module (DYNAMIC_OFFSET_COMPENSATION).

However, a pitch misalignment compensation algorithm can only slowly adjust the pitch estimate, which is not enough for certain aggressive maneuvers/road conditions, i.e., turning on slopes. As such, the pitch calculation from r_pitch.c, which is an external source pitch estimation module, will be used directly here to adjust threshold to avoid false shutdown.

Two global variables, ss_ROUGH_PITCH and ss_FLT_ROUGH_PITCH, are received from r_pitch.c. Adding a virtual high frequency component of pitch estimation (which was lost during the operation) to the ss_ROUGH_PITCH generates the ss_Pitch4Threshold. A deadband, which is the range through which an input can be varied without initiating an observable response, is then applied to this variable in the following:

```
ss_Pitch4Threshold = (ss_ROUGH_PITCH -
ss_FLT_ROUGH_PITCH) + ss_ROUGH_PITCH;
    if    (ABS(ss_Pitch4Threshold)    <=
FF_PITCH4THRESHOLD_ERR_BUDGET)
    {ss_Pitch4Threshold = 0;}
    else
        {if (ss_Pitch4Threshold > 0).
```

A deadband is applied to the filtered yaw rate ss_PlsFltYawRate to generate ss_FfPlsFltYawRate.

Roll rate bias is computed from pitch-angle and yaw rate, ss_RrFromPitch4Threshold, for the threshold. It is then passed through a direction dependent low pass filter. The filter cutoff frequency is, for example, 20 Hz when the magnitude of the input is increasing and 0.1 Hz when the magnitude is decreasing. The output of the direction dependent filter increases as soon as needed while provides dynamic memory to avoid accidental reduction due to signal noises. The filtered roll rate from pitch is further saturated to avoid overflow, as is accomplished in the following code:

```
ss_RrFromPitch4Threshold = ss_Pitch4Threshold *
ss_FfPlsFltYawRate;
if (ABS(ss_RrFromPitch4Threshold) >
ABS(ss_FLT_ABS_RR_FROM_PITCH))
{
ss_FLT_ABS_RR_FROM_PITCH = Flt_Coef1 *
ss_FLT_ABS_RR_FROM_PITCH + (1-
Flt_Coef1)* ABS(ss_RrFromPitch4Threshold);
} /* increasing signal */
else
{
ss_FLT_ABS_RR_FROM_PITCH = Flt_Coef2*
ss_FLT_ABS_RR_FROM_PITCH + (1 - Flt_Coef2)*
ABS(ss_RrFromPitch4Threshold);
} /* decreasing signal */
```

```
ss_FltAbsRrFromPitch4Threshold =
   min(ss_FLT_ABS_RR_FROM_PITCH,
   FF_OVER_FLOW_RRFROMPITCH).
```

The residue signal, ss_FLT_RESIDUE which was obtained above, is normally contaminated by global roll angle estimation error. During certain dynamic maneuvers on high bank road, this error can be large and may cause false detection. As such, the raw sine bank angle, ss_SINE_BANK_ANGLE, is used to adjust the threshold so that the estimation error from global roll plausibility (ss_GLBL_ROLL_PLAUS) can be accommodated. Logic for this adjustment may include:

```
        if (ABS(ss_SINE_BANK_ANGLE)     >
ss_FLT_ABS_GLBL_ROLL_PLAUS)
ss_FLT_ABS_GLBL_ROLL_PLAUS   =   Flt_Coef3    *
ss_FLT_ABS_GLBL_ROLL_PLAUS +
(1- Flt_Coef3)* ABS(ss_SINE_BANK_ANGLE);
} /* increasing signal */
else {
ss_FLT_ABS_GLBL_ROLL_PLAUS = Flt_Coef4 *
ss_FLT_ABS_GLBL_ROLL_PLAUS +
(1-Flt_Coef4)* ABS(ss_SINE_BANK_ANGLE);
} /* decreasing signal */.
```

The ss_SINE_BANK_ANGLE is passed through a direction dependent low pass filter. The filtered signal, filtered absolute global roll plausibility (ss_FLT_ABS_GLBL_ROLL_PLAUS), is then utilized to generate a threshold.

The dynamic factor, ss_DNCF, is an index of the vehicle stability status. When the vehicle is not stable, i.e., ss_DNCF is large, the calculated residue may not truthfully reflect the roll rate sensor fault status. As such, ss_DNCF is also used to adjust the threshold to avoid false detection.

For the same reason, ss_DNCF is passed through a direction dependent low pass filter. The filtered signal, ss_FLT_DNCF, is then utilized to generate the threshold as mentioned above. Logic therefore may include:

```
if(ss_DNCF > ss_FLT_DNCF) {
ss_FLT_DNCF = Flt_Coef5 * ss_FLT_DNCF + (1 - Flt_Coef5)
*ss_DNCF;
}    /*    increasing    signal    */
else {
ss_FLT_DNCF = Flt_Coef6 * ss_FLT_DNCF + (1 - Flt_Coef6)
*ss_DNCF;} /* decreasing signal */.
```

The low pass filtered residue is compared with a dynamic threshold. The threshold is dynamic to accommodate maneuver dependent estimation error of ss_GLBL_ROLL-PLAUS, and roll rate measurement bias. This may be described by:

$$ss\_PLAUS\_THRESHOLD = 5 + 0.5 * \max[0, ss\_FLT\_ABS\_GLBL\_ROLL\_PLAUS - 3] + ss\_FLT\_DNCF + ss\_FltAbsRrFromPitch4Threshold.$$

If the filtered residue is larger than the dynamic threshold, and roll rate magnitude is above, for example, three deg/sec, the controller 26 sets the fault condition. If a fault condition is indicated for a continuation of 400 ms, and no double wheel lift occurs during this period, the fault flag is set (uc_PLAUSIBILITY_FAULT_FLAG).

As was previously discussed, if any fault flag, uc_PLAUSIBILITY_FAULT_FLAG, uc_SSC_FAULT_FLAG, uc_SFC_FAULT_FLAG, is set, RSC is shut down, and the warning lamp is lit. At the same time, a 5-second counter is triggered. If there is no ESP (the underlying system) sensor failure code logged within 5 seconds, a roll rate sensor fault is concluded and the roll rate failure code is logged.

Referring to FIG. 6, an overall logic flow diagram 300 of roll stability control (RSC) logic is illustrated. The logic diagram 300 includes two primary sections. The first is a model based fault detection section 302 that is based on a mathematical model of the system to be diagnosed. The second is a knowledge based fault detection section 304 wherein knowledge about the process and fault when the vehicle is in steady state, when the roll rate should be zero. Signals from these two sections 302, 304 are combined in a diagnosis decision block 306.

Generally, the model based fault detection section 302 includes estimating outputs of the system by observers. A weighted output estimation error is used as residual r(t), and a fault can be detected by comparing the residual with a threshold.

The model based fault detection section 302 includes a reference vehicle roll angle operation block 308 generating a vehicle reference roll angle from the steering wheel angle, the reference velocity, and the lateral acceleration. In other words, the operation block 308 obtains a road bank angle (lower frequency component) and a suspension roll angle (higher frequency component) and adds them together.

The section 302 further includes a compensated roll rate operation block 310 generating a compensated roll rate signal from the aforementioned signals. The compensated roll rate signal compensates for valid roll rate signal biases including, but not limited to, electrical offset within the sensor specification, electrical temperature drift within the sensor specification, and mechanical disturbances from vehicle maneuvers and road conditions.

Compensating for electrical offset includes determining at key-on when the vehicle is standing still, which is determined in the offset compensation module.

Compensating electrical temperature drift is engaged at each sampling instance because the roll rate signal should be equal to zero during straight driving.

Compensating for mechanical disturbances is determined through adjusting the pitch angle with a minute adjustment at each sampling distance because the roll rate signal should equal zero during steady-state turning.

The vehicle reference roll angle signal and the compensated roll rate signal are received in operation block 312, where a comparison is made with observer output and residual generation.

The road bank angle is determined and modulated by the dynamic factor (DNCF) to generate a refined road bank estimate, whereby as the change in lateral dynamics increases, the final bank angle becomes progressively conservative.

The knowledge based fault detection section 304 includes a small roll rate offset check operation block 316 generating a check for small roll rate offset from the roll rate signal, the yaw rate signal, and the longitudinal acceleration signal. The knowledge based fault detection section 304 further includes a sticky roll rate check operation block 318 generating a sticking roll rate fault signal from the aforementioned signals.

The small roll rate offset check operation block 316 generates a check for small roll rate offset that is not detected or compensated in the offset compensation module. During straight driving, roll rate should be zero, otherwise a sensor fault is suspected; and during steady-state turning, roll rate should be $\phi \approx r \sin \theta$, otherwise a sensor fault is suspected.

The sticky roll rate check operation block 318 generates the sticking roll rate fault signal when the roll rate signal is stuck to a constant value. This fault is detected through the suspension roll angle from the lateral acceleration cross checking the roll rate sensor signal. If the suspension roll angle is changing while the roll rate signal remains constant, a sticking fault flag is set.

In operation block 306, the diagnosis decision is made in response to signals from sections 302 and 304. When any of the fault flags are set, e.g. the roll rate fault flag, the sticky fault flag, or the small shift fault flag, responses thereto include: shutting down RSC, lighting a warning lamp, triggering a pre-set counter. In cases where no underlying system sensor failure and no double wheel lift within the counter pre-set timeframe, a roll rate sensor fault is concluded and the roll rate failure code is generated.

In operation, a method for detecting a roll rate sensor fault includes generating a reference roll angle in an inertial frame with available signals other than roll rate, generating a roll rate sensor signal, compensating the roll rate sensor signal for all valid signal biases, comparing the reference roll angle to the roll rate sensor signal through a kinematics relation and a dynamic interaction related by a vehicle suspension, and generating a roll rate sensor fault signal.

The method further includes generating a roll rate fault signal as a function of a reference angle signal, a roll rate signal, and a yaw rate signal; generating global variables as a function of the reference angle signal; adding a virtual high frequency component of pitch estimation to one of the global variables; generating a vehicle dynamic fault threshold as a function of the global variables; generating a residue signal as a function of the reference angle signal and the roll rate signal; adjusting the residue signal as a function of a sine of bank angle signal; generating an adjusted residue signal; generating a fault condition threshold from the adjusted residue signal as a function of the vehicle dynamic fault threshold; setting a fault condition in response to the adjusted residue signal larger than a dynamic threshold and a magnitude of the roll rate signal above the fault condition threshold; and setting a fault flag in response to the fault condition indicated for a predetermined time during which no double wheel lift occurs.

While particular embodiments of the invention have been shown and described, numerous variations and alternate embodiments will occur to those skilled in the art.

What is claimed is:

1. A method for detecting a roll stability control system sensor fault comprising:
    generating a compensated roll rate signal having a first threshold;
    generating a lateral acceleration signal having a second threshold;
    generating a reference velocity signal having a third threshold;
    generating a yaw rate signal having a fourth threshold;
    generating a small roll rate shift flag in response to at least one of said first threshold, said second threshold, said third threshold, and said fourth threshold exceeded for greater than a predetermined time; and
    generating said small roll rate shift flag in response to said second threshold, said third threshold or said fourth threshold exceeded for turning situations or straight driving situations; said second threshold, said third threshold or said fourth threshold having alternate threshold limits for each of said turning situations and said driving situations.

2. A method as in claim 1 wherein generating said small roll rate shift flag further comprises generating said small roll rate shift flag as a function of a small roll rate fault including 3–7 deg/s roll rate fault.

3. A method as in claim 1 wherein generating said small roll rate shift flag further comprises generating said small roll rate shift flag for three situations including straight driving, 0.1 g steady state turns, and 0.2 g steady state turns during which the roll rate $\omega_x$ term should be zero.

4. The method of claim 1 further comprising disabling the method when RSC, AYC or TCS are in cycle.

5. The method of claim 1 further comprising shutting down roll stability control in response to said small roll rate shift flag.

6. The method of claim 1 further comprising activating a warning lamp in response in response to said small roll rate shift flag.

7. The method of claim 1 further comprising terminating roll stability control in response to said small roll rate shift flag and in response to a detection that there is no double wheel lift.

8. The method of claim 1 further comprising generating a dynamic factor; and
    generating a determination of stability as a function at said dynamic factor.

9. The method of claim 8 further comprising low-pass filtering said dynamic factor.

10. The method of claim 1 further comprising generating a dynamic factor;
    generating a dynamic threshold; and
    generating a determination of vehicle stability or vehicle position on a banked surface as a function of said dynamic factor and said dynamic threshold.

11. The method of claim 1, further comprising tuning said first threshold, said second threshold, said third threshold, and said fourth threshold for achieving detection of errors at a desired rate and to avoid false error detection.

12. The method of claim 1 further comprising compensating for a valid signal bias in said roll rate signal.

13. The method of claim 1 further comprising generating a residue signal as a function of a reference angle signal and said roll rate signal;
    adjusting said residue signal as a function of a sine of bank angle signal;
    generating an adjusted residue signal;
    generating a fault condition threshold from said adjusted residue signal as a function of at least one of said first threshold, said second threshold, said third threshold, or said fourth threshold;
    setting a fault condition in response to said adjusted residue signal larger than a dynamic threshold and a magnitude of said roll rate signal above said fault condition threshold; and
    setting a fault flag in response to said fault condition indicated for a predetermined time during which no double wheel lift occurs.

14. A method for detecting a roll stability control system sensor fault comprising:
    generating a roll rate fault signal as a function of a reference angle signal, a roll rate signal, and a yaw rate signal;
    generating global variables as a function of said reference angle signal;

adding a virtual high frequency component of pitch estimation to one of said global variables;

generating a vehicle dynamic fault threshold as a function of said global variables;

generating a residue signal as a function of said reference angle signal and said roll rate signal;

adjusting said residue signal as a function of a sine of bank angle signal;

generating an adjusted residue signal;

generating a fault condition threshold from said adjusted residue signal as a function of said vehicle dynamic fault threshold;

setting a fault condition in response to said adjusted residue signal larger than a dynamic threshold and a magnitude of said roll rate signal above said fault condition threshold; and setting a fault flag in response to said fault condition indicated for a predetermined time during which no double wheel lift occurs.

15. The method of claim 14 further comprising applying a deadband to said vehicle dynamic threshold.

16. The method of claim 14 further comprising applying a deadband to said yaw rate signal.

17. The method of claim 16 wherein applying a deadband to said yaw rate signal further comprises filtering said yaw rate signal.

18. The method of claim 14, wherein generating said vehicle dynamic threshold further comprises generating at least one of a yaw threshold, a pitch threshold, or a roll threshold.

19. The method of claim 14 further comprising passing said roll rate fault signal through a direction dependent low pass filter;

generating a filtered roll rate fault signal; and generating a dynamic memory from said filtered roll rate fault signal.

20. The method of claim 19 further comprising saturating said filtered roll rate fault signal.

21. The method of claim 14, wherein generating said roll rate fault signal further comprises generating said roll rate fault signal as a function of at least one of a roll angle signal, a pitch angle signal or a yaw angle signal.

22. A control system for an automotive vehicle having a vehicle body comprising:

a sensor cluster having a housing oriented within the vehicle body;

a roll rate sensor positioned within the housing generating a roll rate sensor signal corresponding to a roll angular motion of said housing; and a controller receiving said roll rate sensor signal, said controller generating a residue signal in response to a sensor error or a measurement error, said controller setting a fault condition in response to said residue signal larger than a dynamic threshold and a magnitude of said roll rate signal above a fault condition threshold, and said controller setting a fault flag in response to said fault condition indicated for a predetermined time during which no double wheel lift occurs.

23. A system as recited in claim 22, wherein said controller compensates said roll rate sensor signal for all valid signal faults.

24. A system as recited in claim 22, wherein said controller is further adapted to shut down a roll over detection system in response to said fault flag.

25. A system as recited in claim 22, wherein said controller generates a small roll rate shift flag in response to at least one vehicle dynamic threshold exceeded for greater than a predetermined time.

26. A system as recited in claim 25, wherein said vehicle dynamic threshold of: said mu rate sensor signal, a lateral acceleration signal, a reference velocity signal, or a yaw rate signal.

27. A method for detecting a roll rate sensor fault comprising:

generating a reference velocity signal;

generating a lateral acceleration signal;

generating a compensated rollrate signal;

generating a yaw rate signal;

generating a dynamic factor;

generating a small fault flag as a function of, in excess of a predetermined time, at least one of said reference velocity signal exceeding a reference velocity threshold, said lateral acceleration signal exceeding a lateral acceleration threshold, said compensated rollrate signal exceeding a compensated rollrate threshold, said yaw rate signal exceeding a yaw rate threshold, or said dynamic factor exceeding a dynamic threshold; and disabling the method when RSC, AYC or TCS are in cycle.

28. A method for detecting a roll rate sensor fault comprising:

generating a residue signal;

generating a global roll plausibility signal;

generating a dynamic factor signal:

generating a compensated rollrate signal;

generating a pitch signal;

generating a small fault flag;

generating a sticking signal fault flag; and generating a dynamic factor threshold, a plausibility of fault signal, and a plausibility fault flag as a function of said residue signal, said global plausibility signal, said dynamic factor signal, said compensated rollrate signal, said pitch signal, said small fault flag, and said sticking fault flag.

29. The method of claim 28 further comprising setting a fault condition in response to said residue signal larger than said dynamic threshold.

30. The method of claim 29, wherein setting further comprises setting said fault condition in response to said rollrate signal exceeding a rollrate threshold.

31. The method of claim 29 further comprising setting a fault flag in response to said fault condition set for a predetermined time wherein at least three vehicle tires contact a road surface.

* * * * *